United States Patent [19]

Wang et al.

[11] Patent Number: 5,634,095
[45] Date of Patent: May 27, 1997

[54] METHOD OF CONNECTING OBJECTS ON DIFFERENT NOTEBOOK PAGES

[75] Inventors: John S. Wang, Travis County; Richard E. Berry, Williamson County, both of Tex.

[73] Assignee: International Business Machines Corporation, Armonk, N.Y.

[21] Appl. No.: 597,579

[22] Filed: Feb. 2, 1996

Related U.S. Application Data

[63] Continuation of Ser. No. 166,080, Dec. 13, 1993, abandoned.

[51] Int. Cl.$^6$ ................................................ G06F 3/14
[52] U.S. Cl. ........................ 395/326; 395/340; 395/348
[58] Field of Search ................................ 395/155, 156, 395/157, 158, 159, 160, 161

[56] References Cited

U.S. PATENT DOCUMENTS

| | | | |
|---|---|---|---|
| 4,890,098 | 12/1989 | Dawes et al. | 345/120 |
| 4,914,568 | 4/1990 | Kodosky et al. | 395/275 |
| 5,021,976 | 6/1991 | Wexelblat et al. | 395/159 |
| 5,060,135 | 10/1991 | Levine et al. | 395/275 |
| 5,072,412 | 12/1991 | Henderson, Jr. et al. | 395/159 |
| 5,079,695 | 1/1992 | Dysart et al. | 395/700 |
| 5,233,687 | 8/1993 | Henderson, Jr. et al. | 395/158 |
| 5,394,521 | 2/1995 | Henderson, Jr. et al. | 395/158 |
| 5,414,809 | 5/1995 | Hogan et al. | 395/155 |
| 5,416,895 | 5/1995 | Anderson et al. | 395/148 |

OTHER PUBLICATIONS

S.A. Jones et al.; "Graphical Procedural Capability"; IBM Technical Disclosure Bulletin, vol. 33, No. 11, Apr. 1991, pp. 184–191.

A.C. Temple; "Design Extensions to Contents View"; IBM Technical Disclosure Bulletin, vol. 34, No. 4A, Sept. 1991, pp. 385–388.

Kurt J. Schmucker; "MACAPP: an Application Framework"; Byte, Aug. 1986, pp. 189–193.

European Search Report.

"Notebook Tabs as Target Location for Drag/Drop Operations", IBM Technical Disclosure Bulletin, V35 N07, Dec. 1992, p. 207.

"Treating Selections as Objects", IBM Technical Disclosure Bulletin, V35 N06, Nov. 1992, pp. 272–274.

*Primary Examiner*—Mark R. Powell
*Assistant Examiner*—Ruay Lian Ho
*Attorney, Agent, or Firm*—Whitham, Curtis, Whitham & McGinn; Mark S. Walker

[57] ABSTRACT

A visual procedure aides the program builder in linking objects in a visual application builder where the objects are on different pages of the application builder notebook. When the target object is on another page of the notebook, the user selects the source object. The user then flips the notebook page. During the page flipping, the selected source object is shown as an outline shadow with a page number under it. If the new page is shown with the desired target object on it, the user drags and drops a link between the shadow source object and the target object to make a connection. If the user flips to the source object page, then the target object will become the shadow object with a page number label next to it. If the shadow object is too big and covers the target object completely or for any other reason, the user may want to optionally use the outside page connector technique. This can be done by dragging and dropping the link from the source object to any point outside the notebook. The ending point of the link (outside the notebook) will have an outside page connector ICON appear. The user flips the notebook to find the target object. After the target object page is displayed, the user draws a link from the outside page connector to the target object. The user may navigate between the source and target pages by clicking on the page connector ICON.

20 Claims, 17 Drawing Sheets

METHOD OF CONNECTING OBJECTS ON DIFFERENT NOTEBOOK PAGES

This application is a continuation of application Ser. No. 08/166,080, filed on Dec. 13, 1993, abandoned.

BACKGROUND OF THE INVENTION

1. Field of the Invention

The present invention generally relates to the art of object oriented programming in the field of computer science and, more particularly, to a technique for connecting objects on different pages of an visual application program builder which facilitates the design of an application.

2. Description of the Prior Art

The field of computer science known as object oriented programming (OOP) is now the preferred environment for building user-friendly, intelligent computer software. Key elements of OOP are dam encapsulation, inheritance and polymorphism. These elements may be used to generate a graphical user interface (GUI), typically characterized by a windowing environment having icons, mouse cursors and menus. While these three key elements are common to OOP languages, most OOP languages implement the three key elements differently.

Examples of OOP languages are Smalltalk, Object Pascal and C++. Smalltalk is actually more than a language; it might more accurately be characterized as a programming environment. Smalltalk was developed in the Learning Research Group at Xerox's Palo Alto Research Center (PARC) in the early 1970s. In Smalltalk, a message is sent to an object to evaluate the object itself. Messages perform a task similar to that of function calls in conventional programming languages. The programmer does not need to be concerned with the type of data; rather, the programmer need only be concerned with creating the right order of a message and using the right message. Object Pascal is the language used for Apple's Macintosh® computers. Apple developed Object Pascal with the collaboration of Niklaus Wirth, the designer of Pascal. C++ was developed by Bjarne Stroustrup at the AT&T Bell Laboratories in 1983 as an extension of C, which is the language in which the Unix® operating system is written. The key concept of C++ is class, which is a user-defined type. Classes provide object oriented programming features and typically has two kinds of clients called instances and subclasses. C++ modules are compatible with C modules and can be linked freely so that existing C libraries may be used with C++ programs. The preferred embodiment of the invention is written in C++.

The most widely used object based and object oriented programming languages trace their heritage to Simula developed in the 1960s by O-J. Dahl, B. Myhrhaug and K. Nygard of Norway. Further information on the subject of Object Oriented Programming may be had by reference to *Object Oriented Design with Applications* by Grady Booch, The Benjimin/Cummings Publishing Co., Inc., Redwood City, Calif. (1991), and *An Introduction to Object-Oriented Programming* by Timothy Budd, Addison-Wesley Publishing Co. (1991).

Programs have been developed to aid programmers in writing application programs. An early example of such a program in the object oriented programming environment is MacApp for the Apple Macintosh® computers. MacApp is an application framework which is basically a complete, self-contained application that implements most of the Macintosh® user-interface, including pull-down menus and scrolling windows. The program allows the programmer to add, modify or override objects to customize the framework for a specific application. This is all done interactively using a GUI. For more information on the MacApp framework, see "MACAPP: AN APPLICATION FRAMEWORK" by Kurt Schmucker, *BYTE Magazine*, August 1986, pp. 189 et seq.

MacApp is but one of many visual program builders. Typically, when a visual program builder is started by double clicking on the ICON representing the builder program, a visual builder toolbox window is opened. The visual builder toolbox window contains a tool box notebook, each page of which contains the GUI objects, objects created by using the visual builder, or foreign objects that the user receives from other resources. The toolbox notebook is stored by using a persistent framework.

When building application programs with a visual program builder, it is often desired to connect two visual objects. For example, a button or slider object may have a text object associated with it such that when the button or slider is manipulated by a user with a mouse cursor, the text will be displayed. In a linking mode, if both source and target objects are on the same notebook builder page, then the user just presses the left mouse button down while the pointer cursor is in the source object and then moves the pointer cursor to the target object and releases the mouse button. During the mouse movement, a rubber banding line is drawn from the starting point of the source object to the pointer cursor position. After the mouse button is released, the link will be replaced by a link with arrow tail and arrow head to indicate the direction of the link.

A problem arises, however, when two objects on different notebook pages are to be connected. In the visual application builder environment, only one notebook page can be seen at any time. In order to connect the source and target object, both objects should be visible at the same time.

SUMMARY OF THE INVENTION

It is therefore an object of the present invention to provide a technique that facilitates the linking of two visual objects on different pages of a visual application program builder.

According to the invention, there is provided a procedure which aides the program builder in linking visual objects in a visual application builder where the objects are on different pages of the application builder notebook. When the target object is on another page of the notebook, the user may select the source object first. The source object is then highlighted to indicate the selection. The user may flip the notebook page by selecting the notebook tab or next page or previous page button. During the page flipping, the selected source object is shown as an outline shadow with a page number adjacent to it.

If the new page is shown with the desired target object on it, the user may drag and drop a link between the shadow source object and the target object to make a connection. If the user flips to the source object page, then the target object will become the shadow object with a page number label adjacent to it. The links may be hidden by selecting the HIDE LINK action from the action pop-up. If the link is hidden, then the shadow object (either source object or the target object) and its page number label will not be visible.

If the shadow object is too big and covers the target object completely or for any other reason, the user may want to optionally use the outside page connector technique. This can be done by dragging and dropping the link from the source object to any point outside the notebook page. The ending point of the link (outside the notebook page) will have an outside page connector ICON appear. The user may flip the notebook pages to find the target object. After the target object page is displayed, the user may draw a link from the outside page connector ICON to the target object.

A page number will be displayed in the outside page connector ICON to indicate the location of the source object. If the user flips to the page that contains the source object, then the page number of the target object will be shown inside the outside page connector ICONC. If the user flips the notebook page to any page other than the source object page or target object page, then the link along with the outside page connector ICON will be removed. The user may click on the outside page connector ICON to flip the notebook page from the source object page to the target object page or from the target object page back to the source object page. This provides a fast way to navigate between the source object page and the target object page since either the source object or the target object may not have a tab associated with it.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The visual application builder in which the preferred embodiment of the invention has been implemented has a selection mode and a link mode. During the selection mode, the left mouse button is assigned to either single selection or group selection. During the link mode, the left mouse button is assigned to object link. The right mouse button is assigned to pick, drag, and drop in either mode. This convention, however, may vary with the specific application builder and the type of mouse supported.

Figure 1:
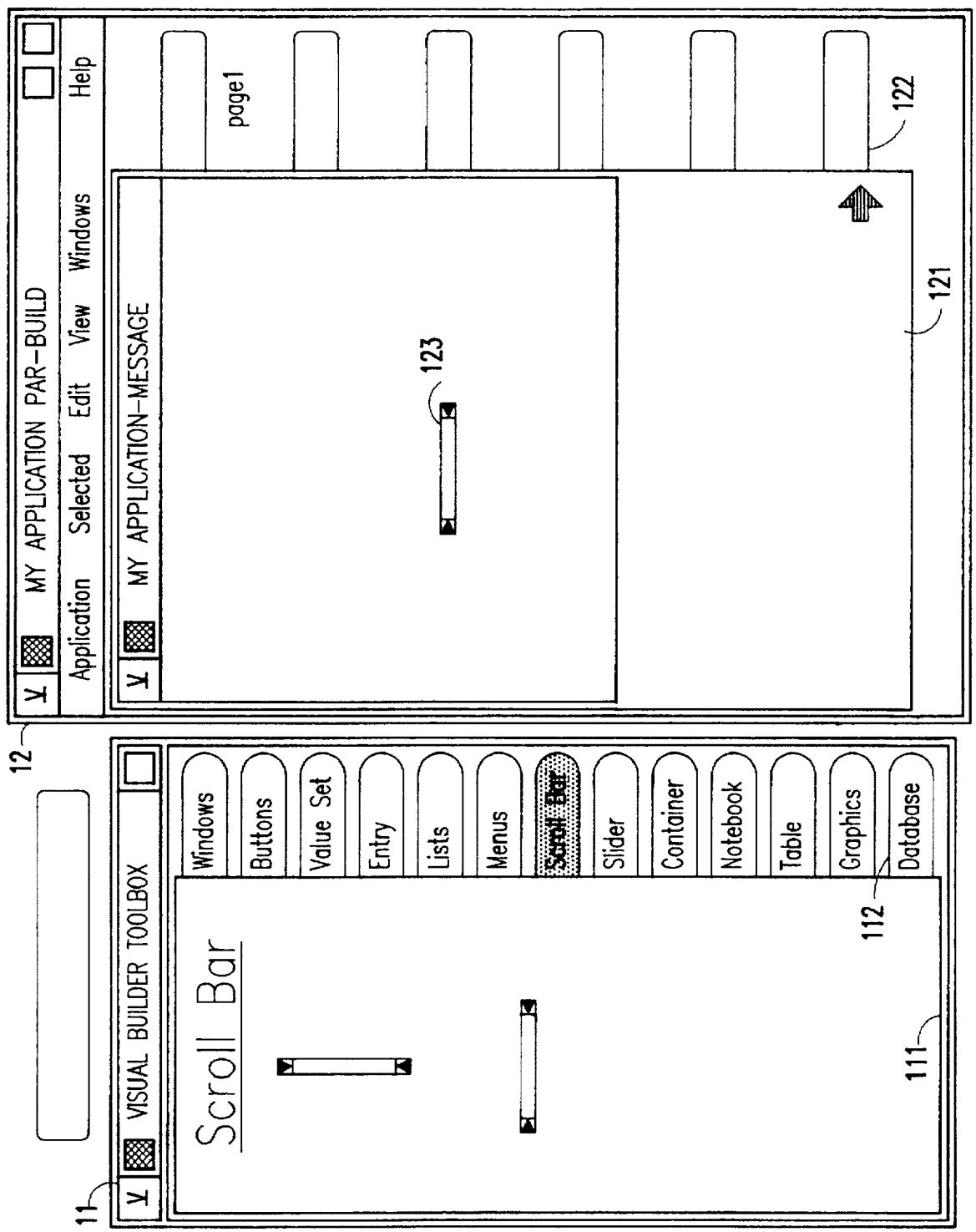
FIG. 1 is an illustration of a first example showing a first displayed page of an application program builder showing a slider object.

Referring now to FIGS. 1 to 7 of the drawings, the invention will be described in terms of a first example. In this example, there is shown a screen of the visual program builder which includes a visual builder toolbox window 11 and an application builder window 12 with a notebook in it. In the toolbox builder window 11, there are a tool page 111 and a plurality of tabs 112, each which connects to a specific tool page. Each page contains different kinds of objects which the user may drag from the toolbox and drop on top of the application builder page in the notebook window 12. In FIG. 1, the SCROLL BAR page has been selected as indicated by the reverse highlight of the corresponding tab. In the application builder page window 12, there are a notebook page 121 and a plurality of tabs 122, each of which connects to a specific notebook page. The notebook pages are used for building the application program.

Figure 2:
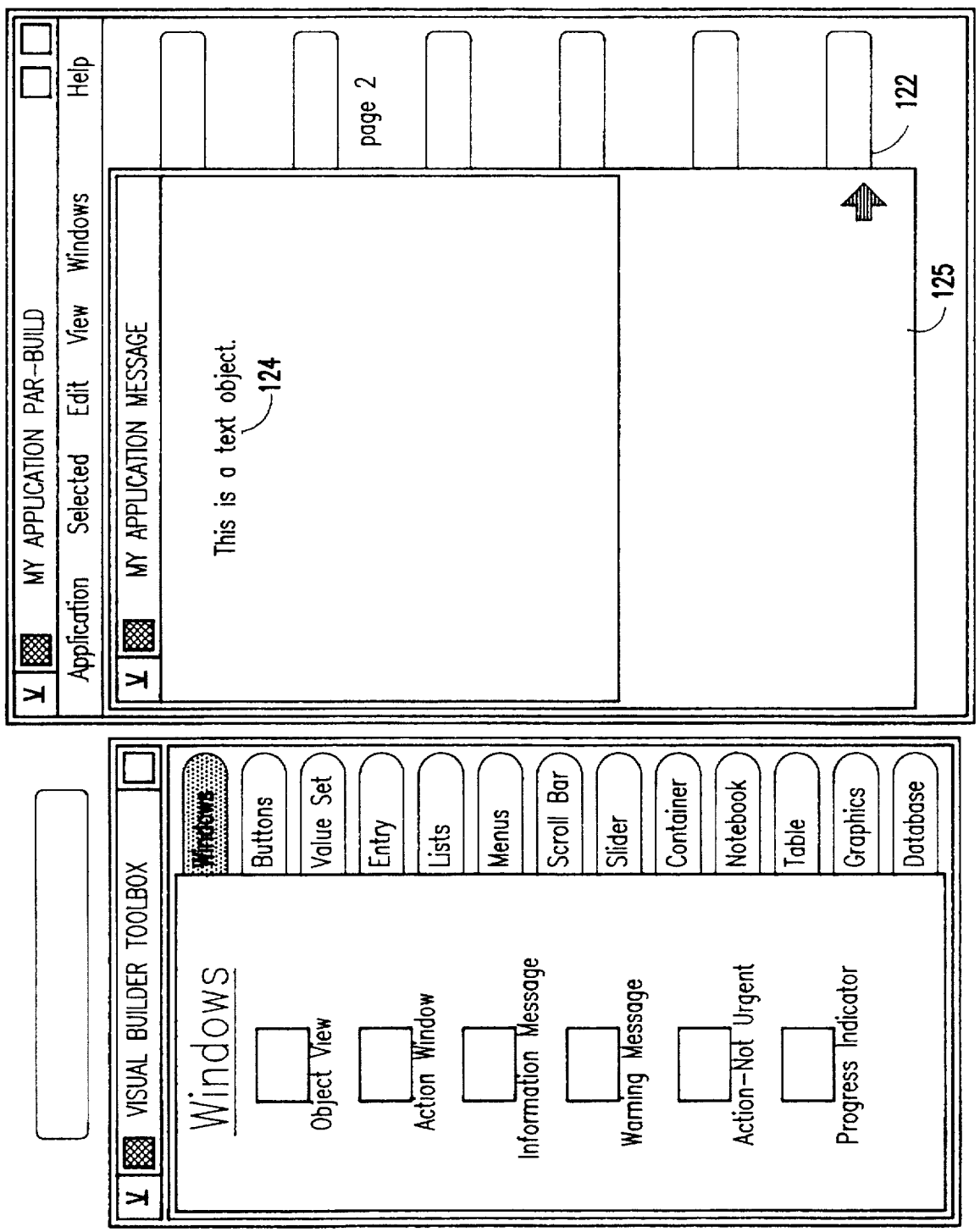
FIG. 2 is an illustration of the first example showing a second displayed page of an application program builder showing a text object to which it is desired to link the slider object on the first page.

Beginning with the example shown in FIGS. 1 to 7, FIG. 1 shows a "scroll bar" object 123 on the displayed page of the notebook 12. This scroll bar object was placed there by dragging and dropping the object from the toolbox window 11. The scroll bar object is a standard object commonly used in GUIs and may be used to control a variety of functions, such a scrolling a window, mixing colors or adjusting volume. In the example, this scroll bar object is to be linked to a text object which might be invoked if a user of the application program requested help by clicking on a HELP button. In FIG. 2, the text object 124 to which the scroll bar object is to be linked is shown on another page of the notebook, here denoted as 125. In the example, the scroll bar object 123 is the "source" object, and the text object 124 is the "target" object.

Figure 3:
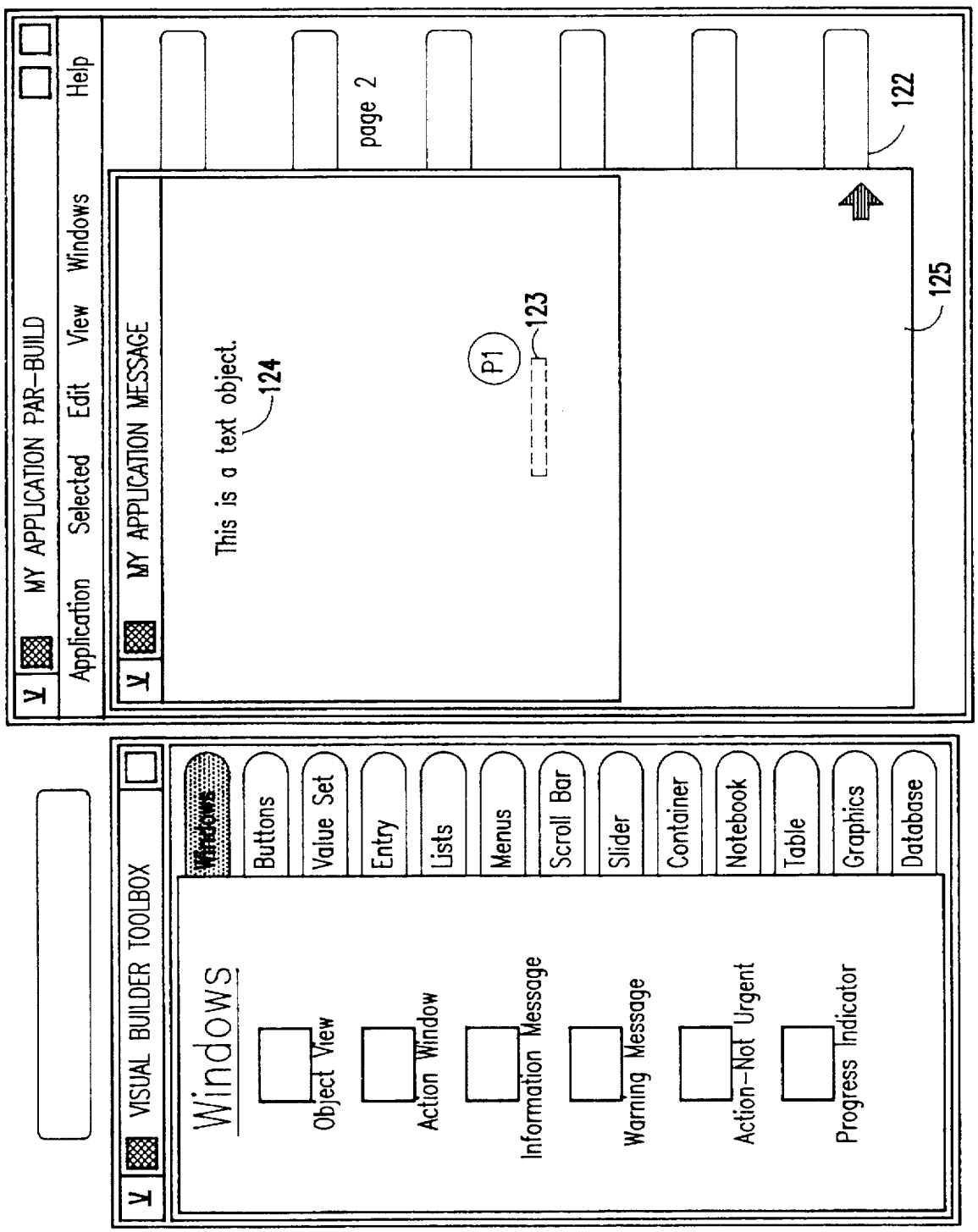
FIG. 3 is an illustration of the first example showing the second displayed page showing a shadow of the slider with a page number label.

If the target object is on another page of the application builder notebook, the user may select the source object first. This is done, in the builder mode, by clicking on the source object (i.e., the scroll bar); that is, by placing the pointer cursor over the source object and pressing the left mouse button. The source object is then highlighted to indicate the selection, and a connection handle appears. The user may flip the notebook page by selecting the notebook tab or next page or previous page buttons. During the page flipping, the selected source object is shown as an outline shadow with a page number under it. In FIG. 3, the user has moved to the page (i.e., page 125) with the text object 124 where, in addition to showing the page object 124, the scroll bar object 123 in shadow is shown.

Figure 4:
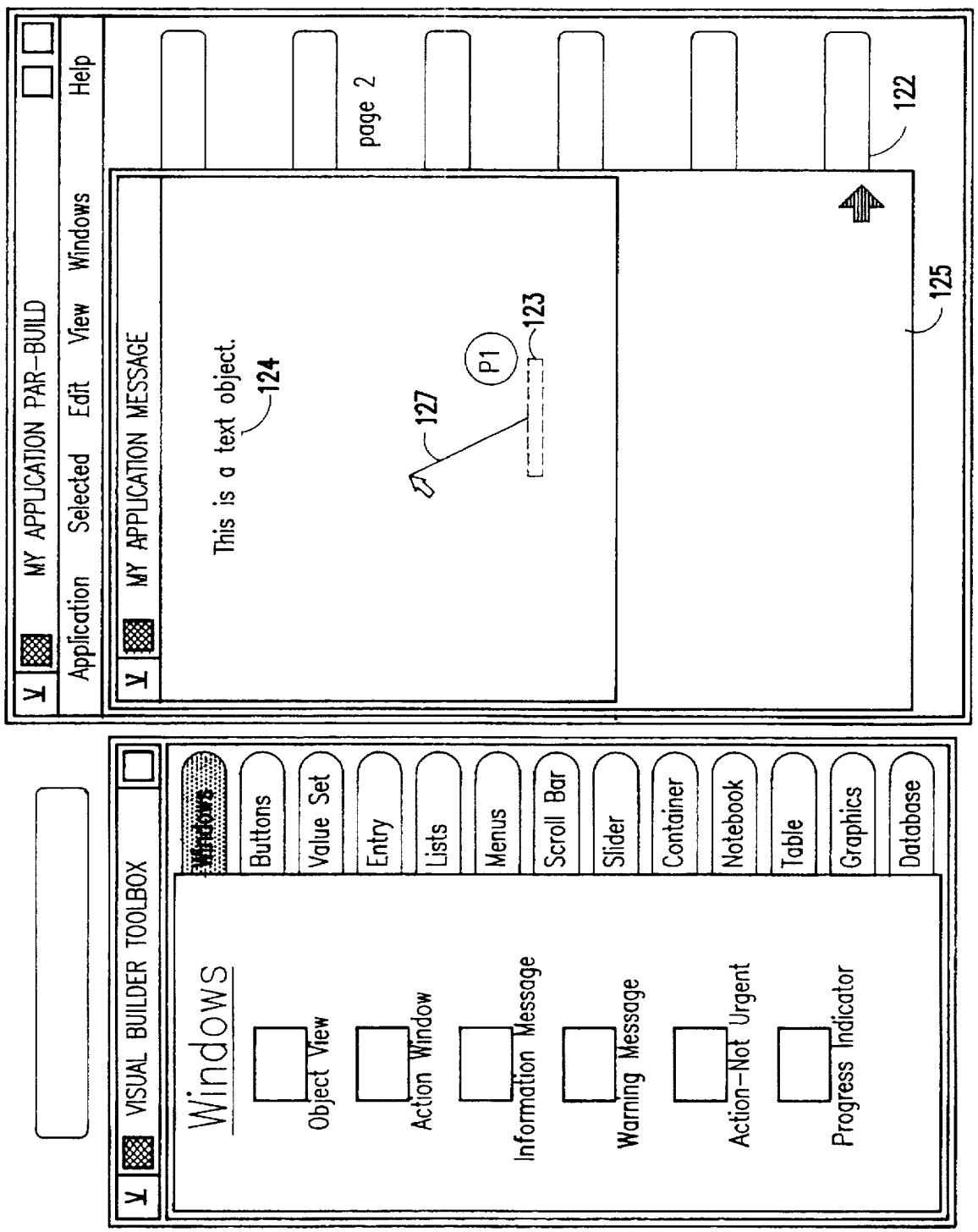
FIG. 4 is an illustration of the first example showing the second displayed page showing a rubber banding from the shadow of the slider to the text object.
Figure 5:
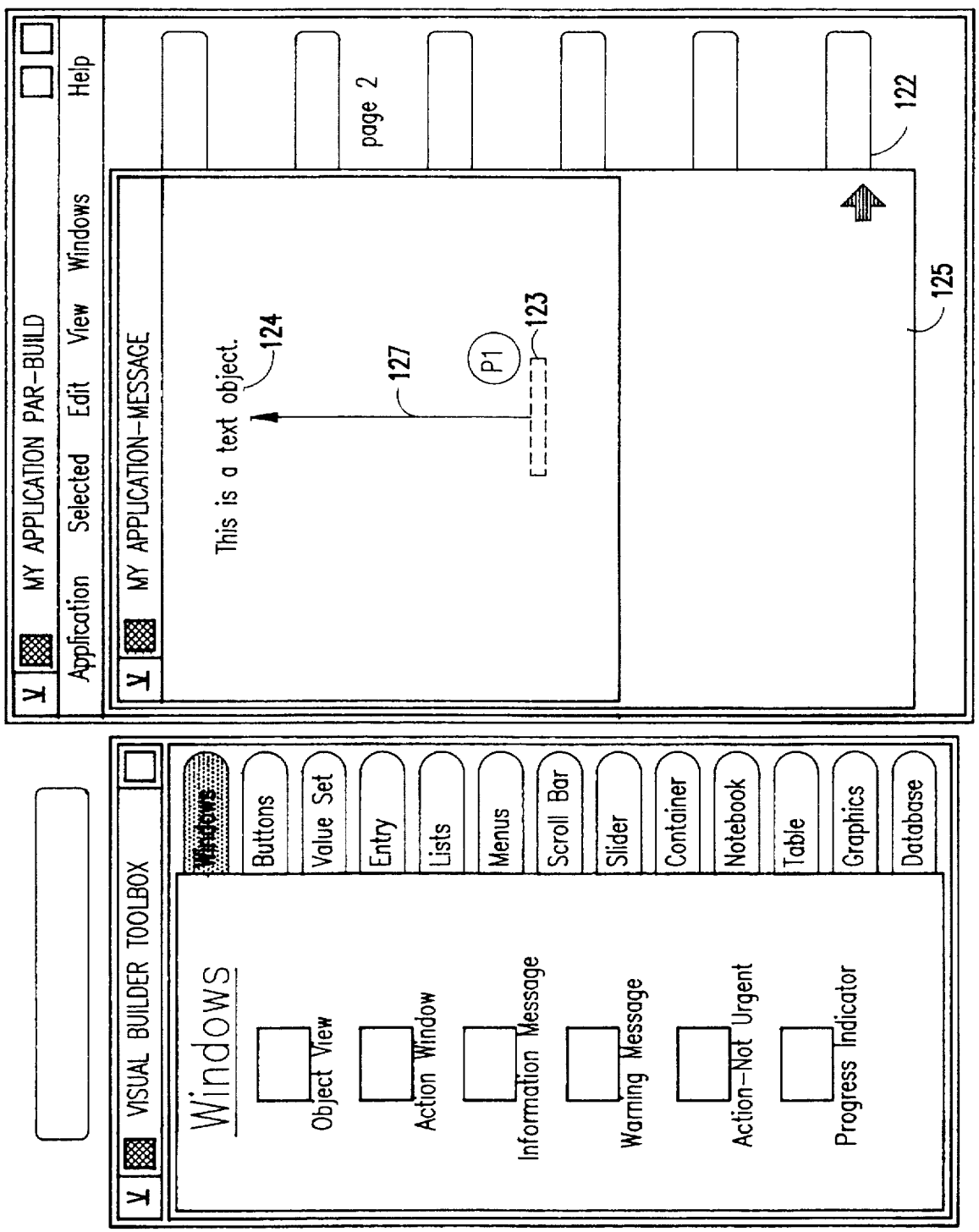
FIG. 5 is an illustration of the first example showing the second displayed page showing the link with an arrow head to the text object indicating that a successful linking of the slider object with the text object has occurred.
Figure 6:
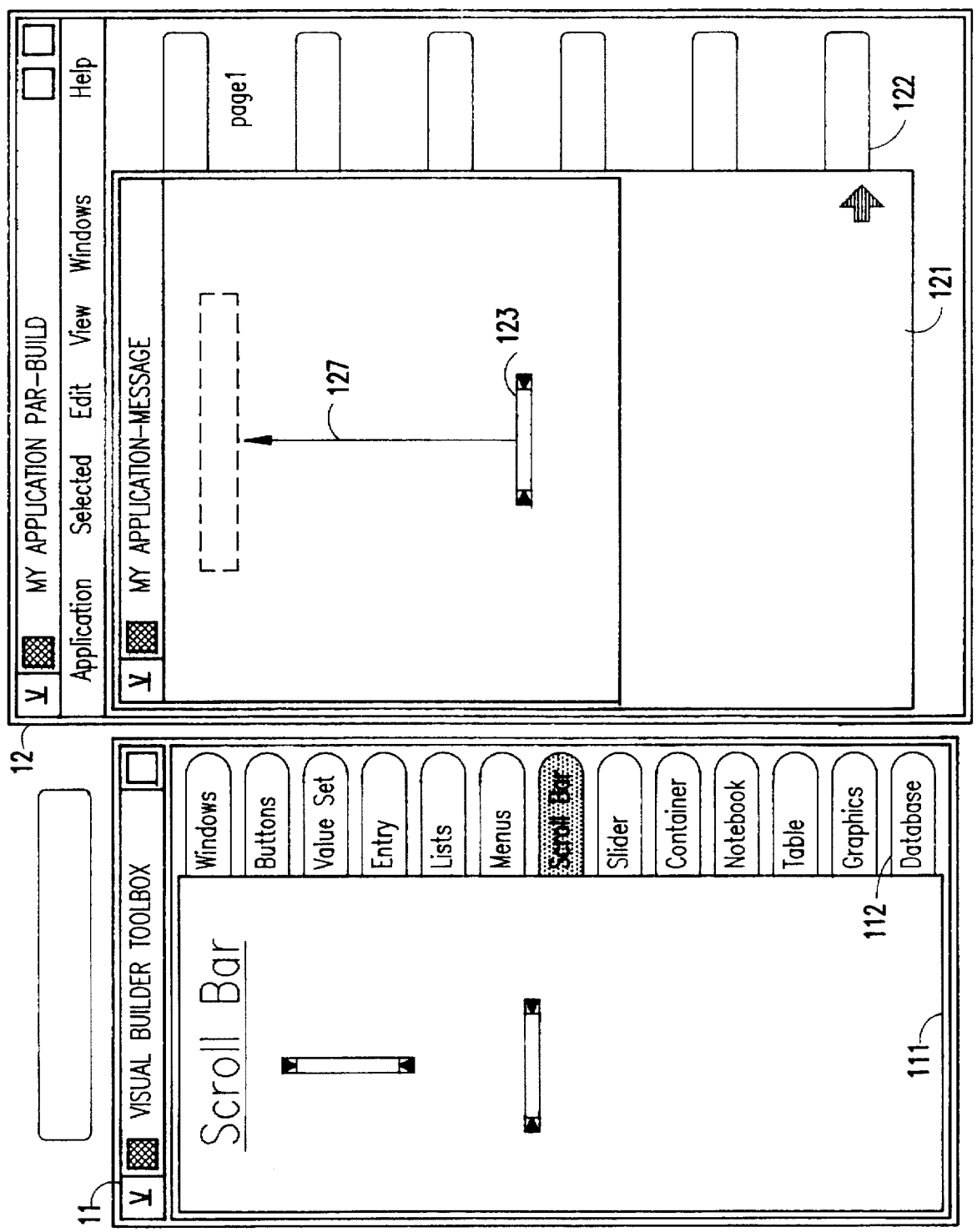
FIG. 6 is an illustration of the first example showing the first displayed page after linking between the slider object and the text object showing a shadow of the text object.
Figure 7:
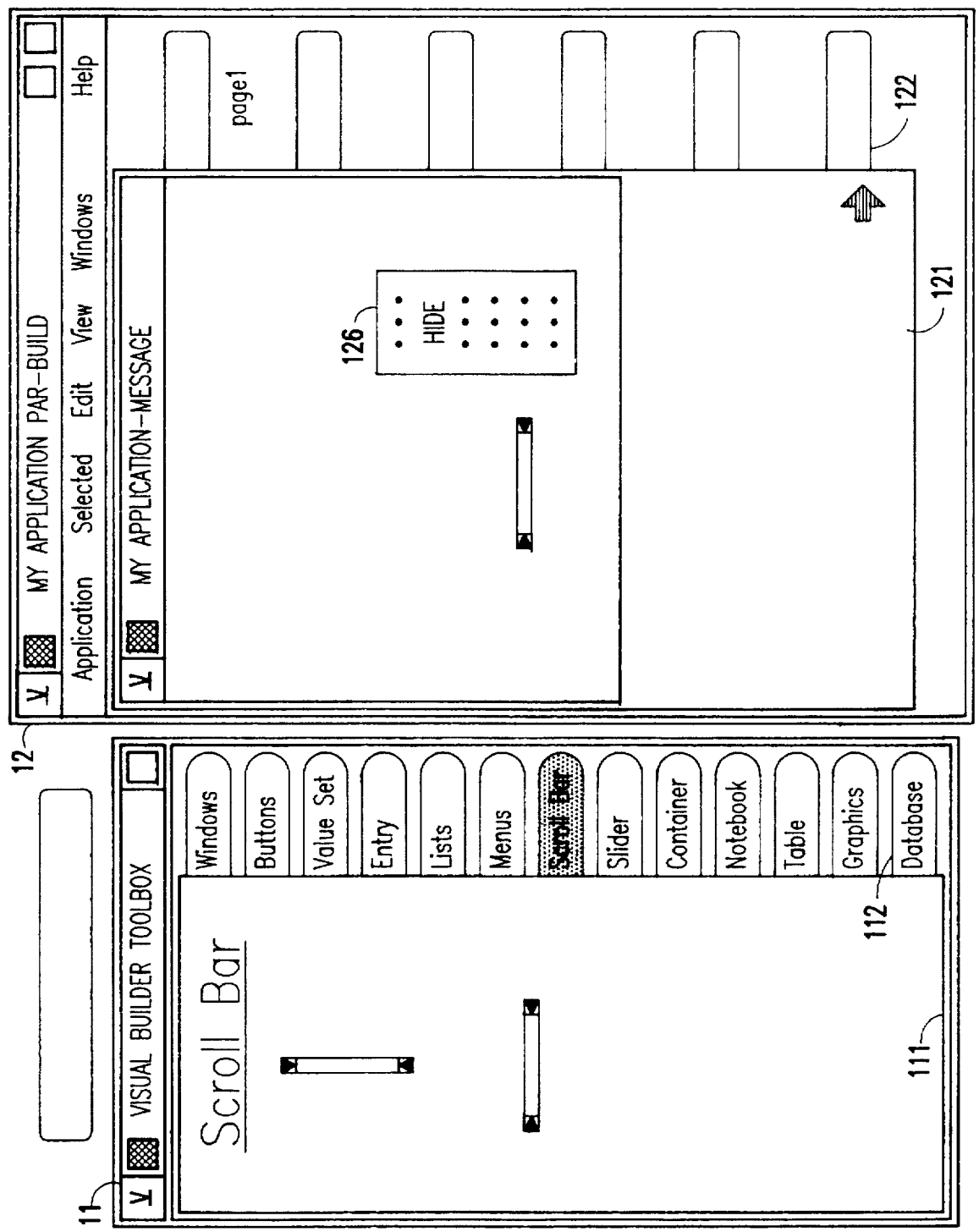
FIG. 7 is an illustration of the first example as in FIG. 6 but showing the pop-up window from which the HIDE command may be selected.

Now, with the new page shown with the desired target object on it, the user may drag and drop a link between the shadow source object and the target object to make a connection. This is shown in FIG. 4 with a link 127 extending from the source, or scroll bar, object 123 and the target, or text, object 124. When the connection is successfully completed, the line 127 "snaps" to the shortest line between the source shadow and the target, as shown in FIG. 5. If the user flips to the source object page, as shown in FIG. 6, then the target object will become the shadow object with a page number label next to it. The links may be hidden by selecting the HIDE LINK action from an action pop-up 126 shown in FIG. 7. If the link is hidden, then the shadow object (either source object or the target object) and its page number label will not be visible.

Figure 8:
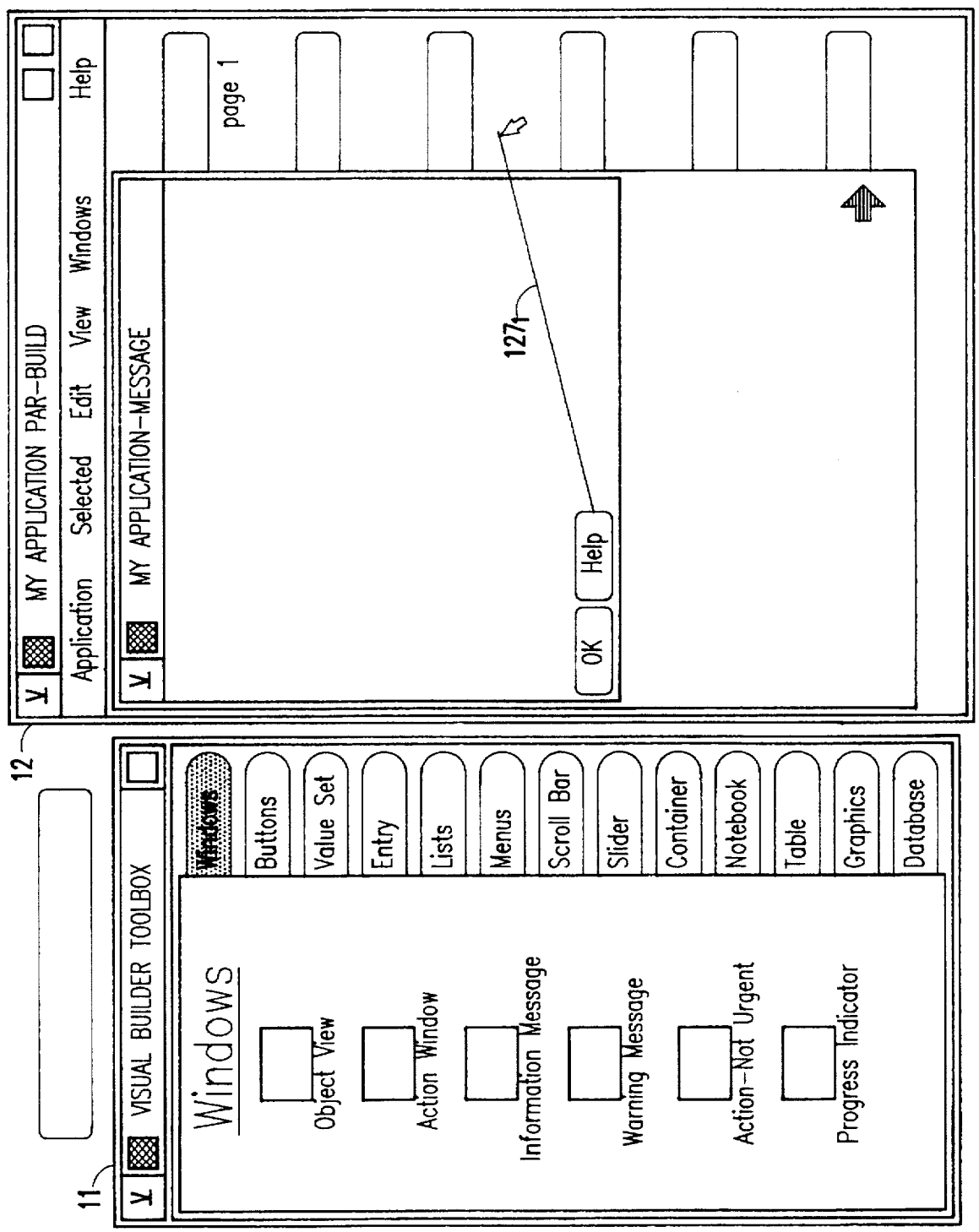
FIG. 8 is an illustration of a second example showing a first displayed page showing a link from a HELP button extending to off the page.
Figure 9:
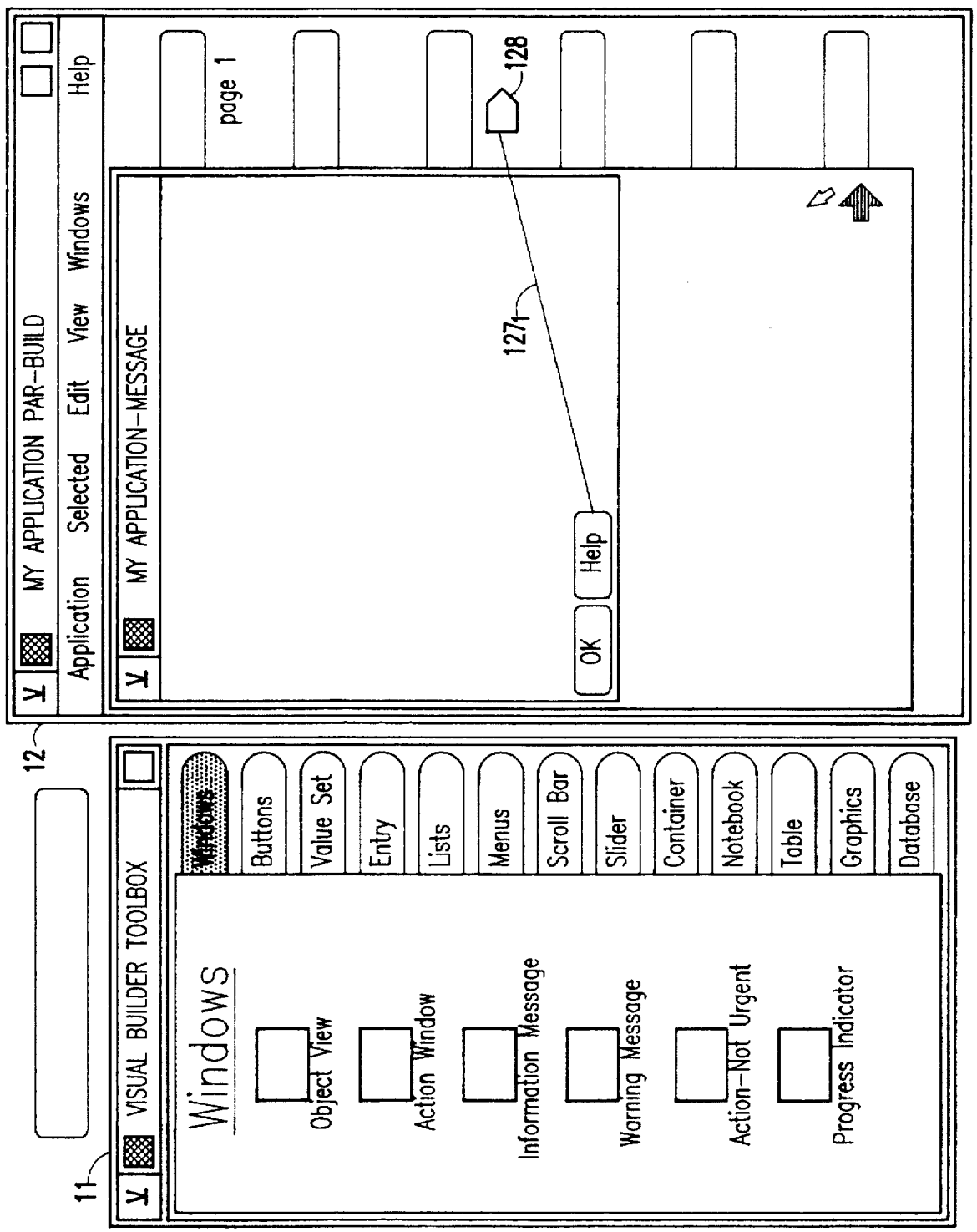
FIG. 9 is an illustration of the second example showing the first displayed page showing a page connector ICON off the page as a connector to the link.
Figure 10:
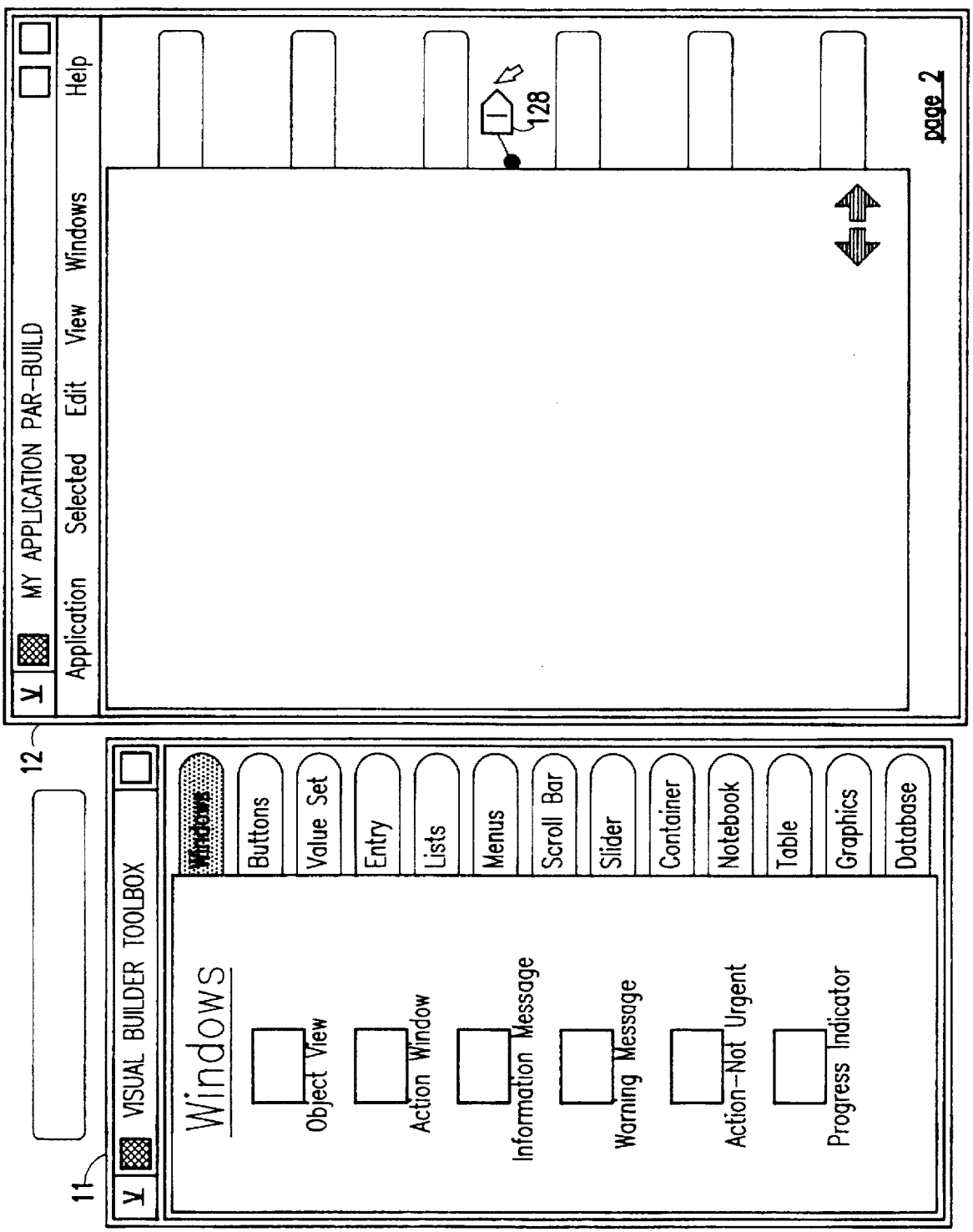
FIG. 10 is an illustration of the second example showing a second displayed page showing the page connector ICON visible off the page.
Figure 11:
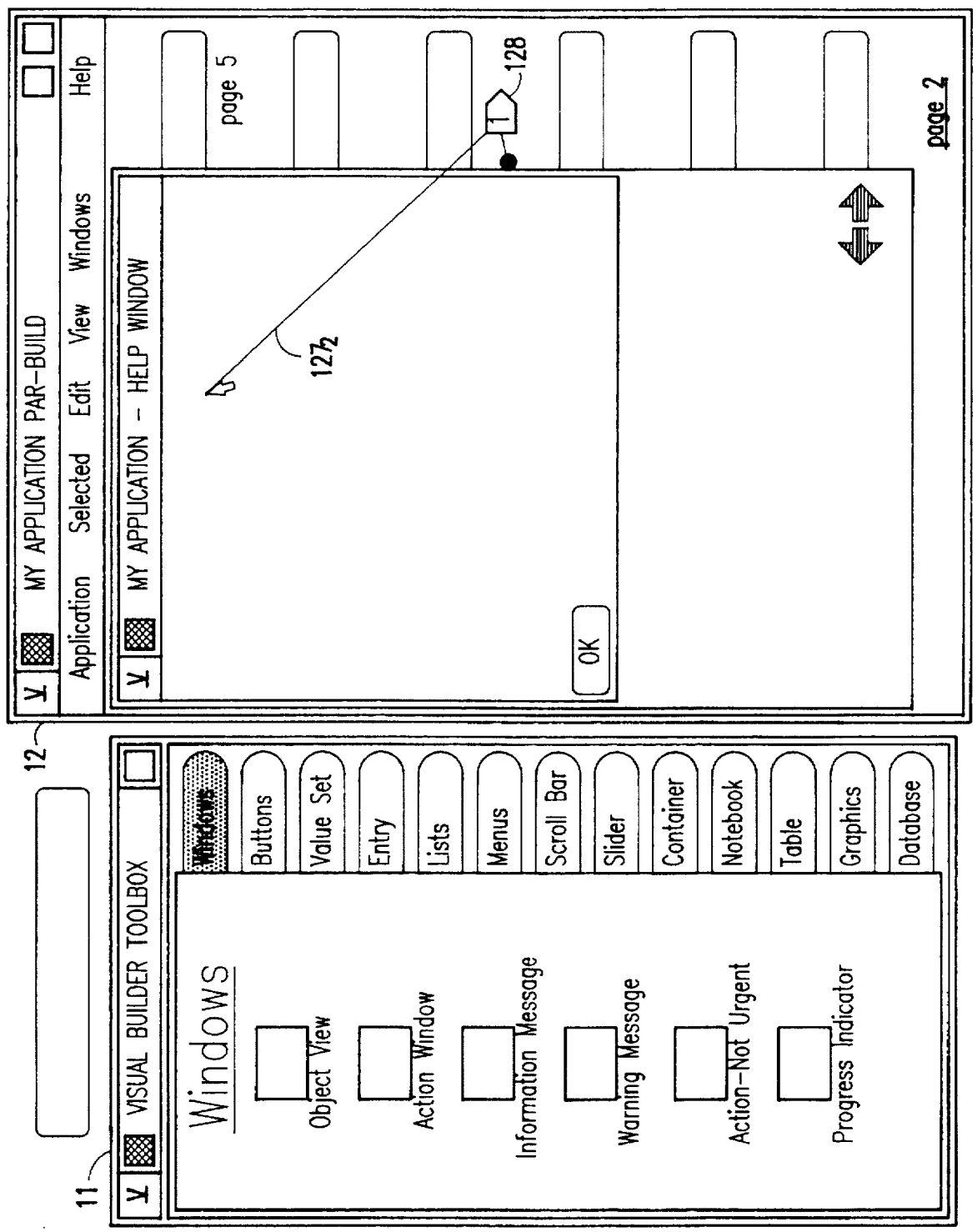
FIG. 11 is an illustration of the second example showing the second displayed page showing the extension of the link from the page connector ICON to the title bar of the window.
Figure 12:
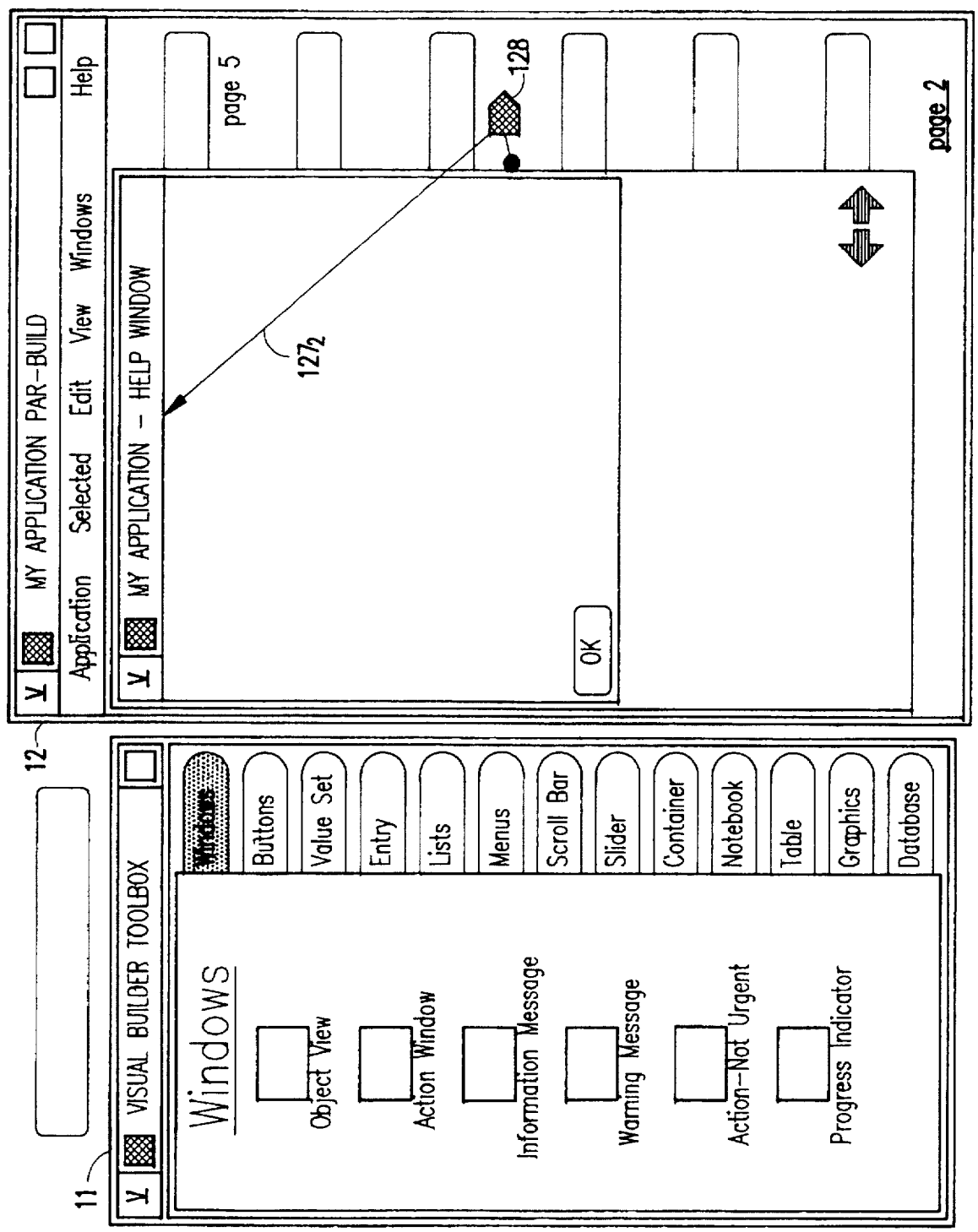
FIG. 12 is an illustration of the second example showing the second displayed page showing a pop-up menu entitled EVENT and the formation of an arrow head on the link indicating a successful linking of objects.

If the shadow object is too big and covers the target object completely, the user may want to use the outside page connector technique, which is illustrated by the second example shown in FIGS. 8 to 12. This can be done by dragging and dropping the link $127_1$ from the source object to any point outside the notebook page, as shown in FIG. 8. The ending point of the link (outside the notebook page) will have an outside page connector ICON 128 appear, as shown in FIG. 9. A page number will be displayed in the outside page connector 128 to indicate the location of the source object. The user may flip the notebook pages to find the target object. After the target object page is displayed, as shown in FIG. 10, the user may draw a link $127_2$ from the outside page connector 128 to the target object, as shown in FIG. 11, similar the first example. The successful completion of the connection of the link is indicated in FIG. 12 by the formation of the arrow head to the action bar.

As indicated in the illustration of FIG. 10, the page number of the source object is shown inside the page connector ICON 128 so that the page on which the source object is located is identified as the user flips to the page containing the target object. After the link is established between the source and target objects on different pages of the notebook, if the user flips to the page that contains the source object, then the page number of the target object will be shown inside the outside page connector ICON 128. If the user flips the notebook to any page other than the source object page or the target object page, then the link along with the outside page connector ICON will be removed. The user may click on the outside page connector ICON to flip the notebook page from the source object page to the target object page or from the target object page back to the source object page. This provides a fast way to navigate between the source object page and the target object page since either the source object or the target object may not have a tab associated with it.

Figure 13:
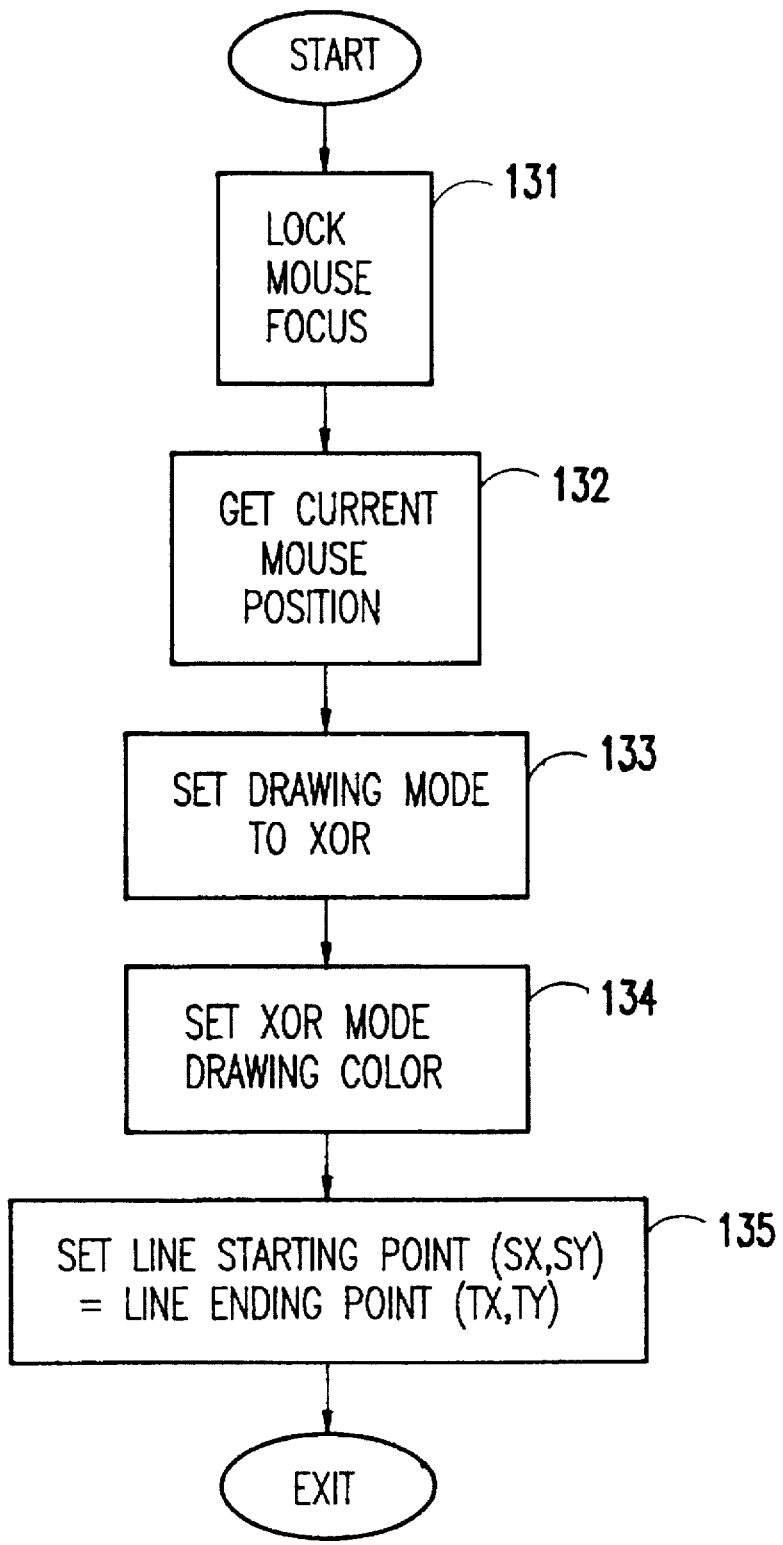
FIG. 13 is a flow diagram showing the logic of the method for detecting a press of the left mouse button.

FIG. 13 is a flow diagram showing the process that handles a mouse button press event during the LINK mode. The first step in the process is to lock the mouse focus in function block 131. Next, in function block 132, the current mouse position is obtained. The drawing mode is set to Exclusive OR (XOR) in function block 133, and the XOR mode is set to the drawing color in function block 134. These two operations are how the mouse cursor and objects attached to the mouse cursor are displayed over the screen image. Finally, the line starting point is set to equal the line ending point in function block 135. At the completion of this method, the mouse cursor is initialized to permit the user to drag and drop objects, including lines that indicate linkages between objects.

The pseudocode for the process shown in FIG. 13 is as follows:

```
METHOD MOUSE_BUTTON_1_PRESSED
    LOCK MOUSE FOCUS
    GET THE CURRENT MOUSE POSITION
    SET THE DRAWING MODE TO XOR
    SET THE XOR MODE DRAWING COLOR
    SET LINE STARTING POINT (SX,SY) = LINE ENDING
        POINT (TX,TY)
ENDMETHOD
```

Figure 14:
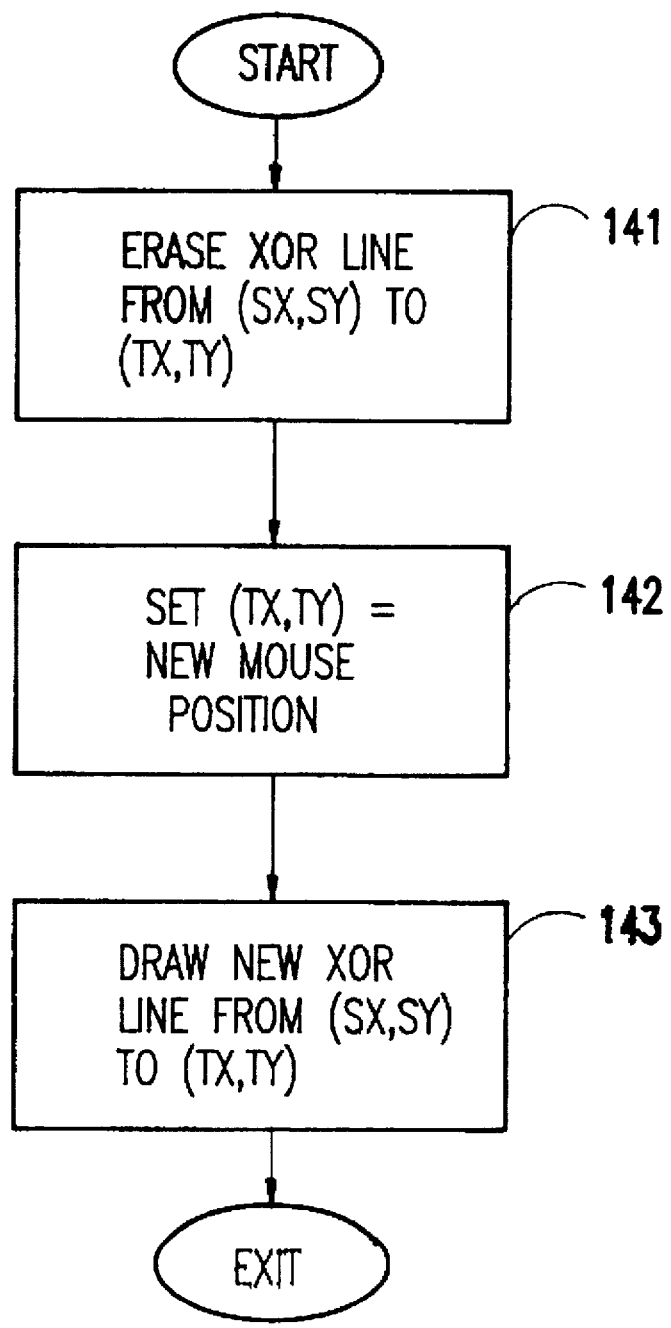
FIG. 14 is a flow diagram showing the logic of the method for detecting the movement of the mouse while the left mouse button is pressed.

FIG. 14 is a flow diagram showing the method that handles a mouse button 1 move event during the CONNECT mode. The first step in the method is to erase the XOR line from the starting point to the ending point in function block 141. Next, in function block 142, the ending point is set to the new mouse position. And finally, in function block 143, a new XOR line is drawn from the starting point to the ending point.

The pseudocode for the process shown in FIG. 14 is as follows:

```
METHOD MOUSE_BUTTON_1_MOVED
    ERASE XOR LINE FROM (SX,SY) TO (TX,TY)
    SET (TX,TY) = THE NEW MOUSE POSITION
    DRAW THE NEW XOR LINE FROM (SX,SY) TO (TX,TY)
ENDMETHOD
```

Figure 15:
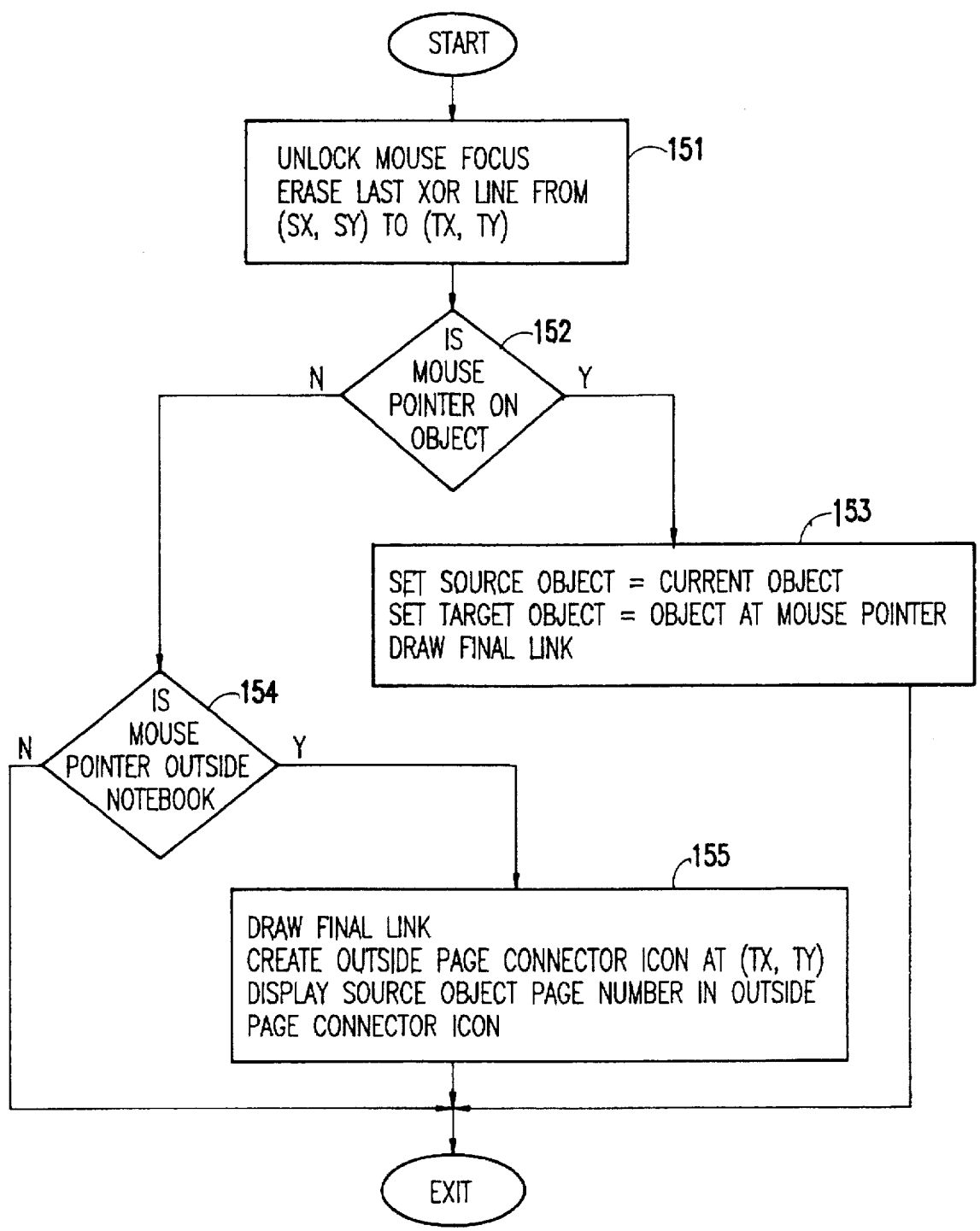
FIG. 15 is a flow diagram showing the logic of the method for detecting the release of the left mouse button.

FIG. 15 is a flow diagram showing the method that handles the mouse button 1 release event during the LINK mode. The mouse focus is first unlocked and the last XOR line is erased in function block 151. Then a test is made in decision block 152 to determine if the pointer cursor is on an object. If so, the source object is set equal to the current object, target object is set equal to the object at the mouse pointer, and the final link is drawn in function block 153. If the pointer cursor is not on an object, a further test is made in decision block 154 to determine if the mouse pointer is outside the notebook. If not, the process exits; otherwise, the final link is drawn, an outside page connector ICON is created at the target location (TX,TY), and the source object page number is displayed in the outside page connector ICON in function block 155 before the process exits. To provide visual feedback for the user, a line in the form of an arrow is drawn between the source and target objects in function blocks 153 and 155.

The pseudocode for the process shown in FIG. 15 is as follows:

```
METHOD MOUSE_BUTTON_1_RELEASED
    UNLOCK THE MOUSE FOCUS
    ERASE THE LAST XOR LINE FROM (SX,SY) TO
        (TX,TY)
    IF (POINT (TX,TY) IS ON ANY OBJECT) THEN
        SET SOURCE OBJECT = CURRENT OBJECT
            RECEIVING EVENT
        SET SOURCE OBJECT = OBJECT AT THE
            POINTER CURSOR POSITION
        DRAW FINAL LINK
    ELSE
        IF (POINTER CURSOR IS OUTSIDE OF THE
            NOTEBOOK PAGE) THEN
            DRAW THE FINAL LINK FROM (SX,SY)
                TO (TX,TY)
            CREATE OUTSIDE PAGE CONNECTOR
                OBJECT AT (TX,TY)
```

```
            DISPLAY THE SOURCE OBJECT PAGE
                NUMBER IN THE OUTSIDE PAGE
                    CONNECTOR
        ENDIF
    ENDIF
ENDMETHOD
```

Figure 16:
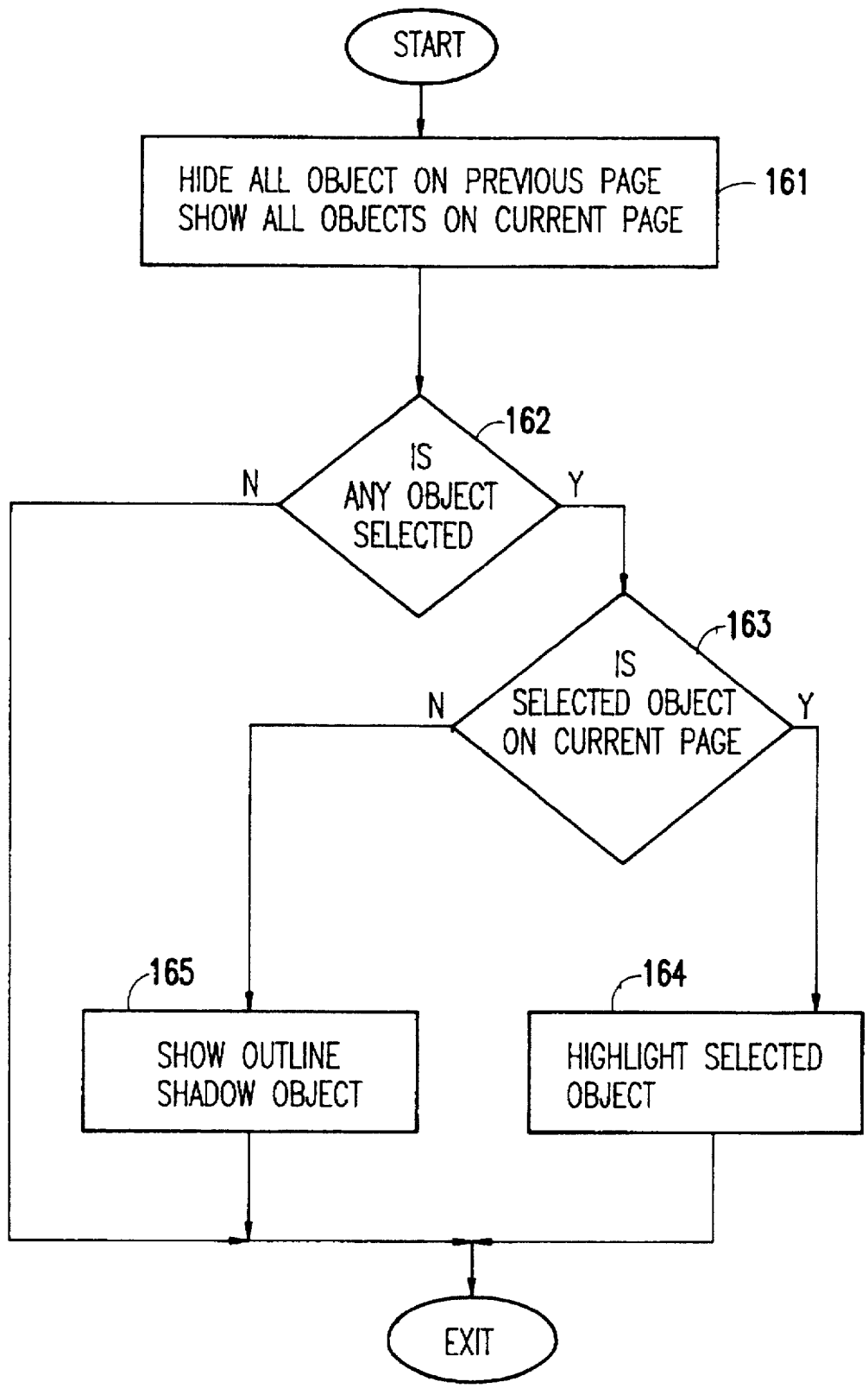
FIG. 16 is a flow diagram showing the logic of the method for handling the select event for the notebook tab object.

FIG. 16 is a flow diagram showing the method that handles the select event for the notebook tab object. The first step is to hide all the objects on the previous page and then to show all objects on the current page, in function block 161. A test is then made in decision block 162 to determine if any object is selected. If not, the process ends; otherwise, a further test is made in decision block 163 to determine if the selected object is on the current page. If so, the selected object is highlighted in function block 164; otherwise, the selected object is shown in shadow or outline form in function block 165.

The pseudocode for the process shown in FIG. 16 is as follows:

```
METHOD SELECT_TAB
    HIDE ALL THE OBJECTS ON THE PREVIOUS PAGE
    SHOW ALL THE OBJECTS ON THE CURRENT PAGE
    IF (ANY OBJECT IS SELECTED) THEN
        IF (THE SELECTED OBJECT IS ON THE
                CURRENT PAGE) THEN
            HIGHLIGHT THE SELECTED OBJECT
        ELSE
            HIGHLIGHT THE SELECTED OBJECT AS
                THE OUTLINE SHADOW
        ENDIF
    ENDIF
ENDMETHOD
```

Figure 17:
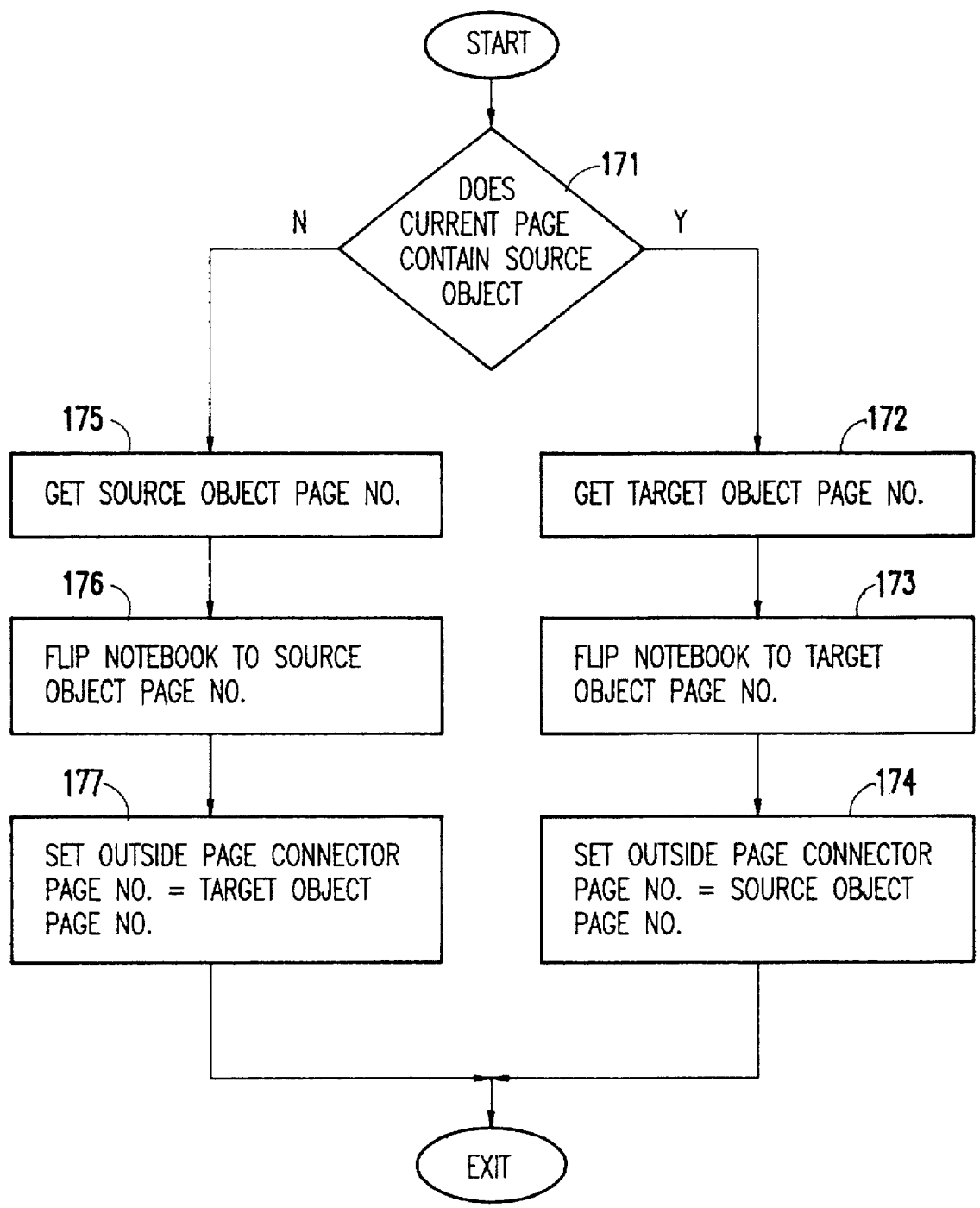
FIG. 17 is a flow diagram showing the logic of the method for handling the select event for the outside page connector ICON.

FIG. 17 is a flow diagram showing the method that handles the select event for the outside page connector object. A test is first made in decision block 171 to determine if the current page contains the source object. If so, the target object page number is obtained in function block 172. Then the notebook pages are flipped to the target object page in function block 173. Finally, the outside page connector ICON number is set to be the source object page number in function block 174. If, on the other hand, the current page shows the target object, then source object page number is obtained in function block 176. The notebook pages are flipped to the source object page in function block 177, and the outside page connector ICON number is set to be the target object page number in function block 178.

The pseudocode for the process shown in FIG. 17 is as follows:

```
METHOD SELECT_OUTSIDE_PAGE_CONNECTOR
    IF (CURRENT PAGE CONTAINS SOURCE OBJECT) THEN
        GET TARGET OBJECT PAGE NUMBER
        FLIP NOTEBOOK TO THE PAGE CONTAINING
            THE TARGET OBJECT
        SET PAGE NUMBER IN OUTSIDE PAGE
            CONNECTOR = SOURCE OBJECT PAGE
            NUMBER
    ELSE
        GET SOURCE OBJECT PAGE NUMBER
        FLIP NOTEBOOK TO THE PAGE CONTAINING
            THE SOURCE OBJECT
        SET PAGE NUMBER IN OUTSIDE PAGE
            CONNECTOR = TARGET OBJECT PAGE
            NUMBER
    ENDIF
ENDMETHOD
```

This last process provides a convenient and powerful way to navigate between the source of and target objects which may not have tabs associated with them.

While the invention has been described in terms of a single preferred embodiment and illustrated by two examples, those skilled in the art will recognize that the invention can be practiced with modification within the spirit and scope of the appended claims.

Having thus described our invention, what we claim as new and desire to secure by Letters Patent is as follows:

1. A graphical aid method of linking objects on different pages of a visual program builder, said visual program builder having a selection made and a link mode, said method comprising the steps of:

displaying an application program builder window on a computer display, multiple pages in said window being used for building an application program, said window displaying a single page on which a portion of an application program is built using the visual application program builder;

responding to user inputs during building of an application program by placing objects which comprise portions of the application program being built on respective pages of the application program builder window;

responding to a user command to link objects on pages window by switching said visual program builder to said link mode of operation;

responding to a user selection of a source object on a first page in said window by generating a link line extending from the source object to a pointing cursor;

responding to a user tab to a second page in said window by displaying said second page with a target object; and responding to a user selection of the target object by extending the link line to the target object, completing the logical link of the source object to the target object in the application program builder window, said logical link forming a part of the application program being built using said visual program builder.

2. The method recited in claim 1 wherein upon displaying said second page, the source object is displayed in shadow form on the second page, and the step of completing the link includes generating a link line from the shadow form of the source object to the target object.

3. The method recited in claim 2 further comprising the step of responding to a user tab to the first page of the visual program builder after the step of completing the link by displaying said first page with the target object in shadow form.

4. The method recited in claim 1 wherein, in response to a user moving the pointing cursor off the first page starting from the source object, a page connector icon is generated off the first page, said page connector icon including a page number corresponding to said first page, and wherein the step of extending the link line upon selecting the target object on the second page is done by drawing the link line from the page connector icon off the page to the target object.

5. The method recited in claim 4 further comprising the step of responding to a user tab to the first page in said window after the step of completing the link by displaying said first page with the page connector icon off the page but with a page number corresponding to said second page.

6. The method recited in claim 5 further comprising the step of navigating between the first and second pages in said window by responding to a user selection of the page connector icon and flipping to a page corresponding to the page number in the page connector icon.

7. The method recited in claim 1 further comprising, after the step of completing the logic link of the source object to the target object, the step of responding to a user command to hide the link by not displaying the link line between the source and target objects.

8. An apparatus supporting a graphical aid for linking objects on different pages of a visual program builder, said visual program builder running on a computer and having a selection mode and a link mode, comprising:

a display device connected to said computer, said display device displaying an application program builder window generated by said visual program builder running on said computer, multiple pages in said window being used for building an application program, said window displaying a single page on which a portion of an application program is built using the visual program builder;

an input device for receiving user inputs during building of an application program by placing objects which comprise portions of the application program being built on respective pages of the application program builder window as each page is displayed in the window, said input device further receiving a user command to link objects on different pages in the window by switching said visual program builder to mid link mode of operation;

a pointing cursor controlled by a user to select a source object on a first page in said window by generating a link line extending from the source object to said pointing cursor; and page selection means responsive to a user tab to a second page in said window for displaying said second page with a target object;

said pointing cursor further being controlled by a user to select the target object by extending the link line to the target object, completing the logical link of the source object to the target object in the visual program builder, said logical link forming a part of the application program being built using said visual program builder.

9. The apparatus reeked in claim 8 wherein the page selection means displays on said second page the source object in shadow form, and said pointing cursor device completes the link by generating a link line from the shadow form of the source object to the target object.

10. The apparatus recited in claim 8 wherein, when the pointing cursor is moved off the first page starting from the source object, said pointing cursor device generates a page connector icon off the first page, said page connector icon including a page number corresponding to said first page, and wherein said pointing cursor extends the link line from the page connector icon off the page to the target object on the second page.

11. The method recited in claim 1 further comprising the step of displaying a visual program builder toolbox window on the computer display, said toolbox window displaying specific graphic object tools for use in building an application program.

12. The method recited in claim 11 wherein the step of placing objects on pages of the application program builder window comprises the step of:

responding to a user selection of a displayed graphic object tool and performing a drag and drop operation to place the graphic object tool on a page in said application program builder window.

13. In a visual program builder having a display device and a pointing device, said display device displaying a plurality of windows, including a toolbox window and an application window, said visual program builder having building tools and application elements represented by object icons arranged in said toolbox window and said application window, respectively, each said window having multiple pages displayed one page at a time in said toolbox window and application window, respectively, said visual program builder having a selection mode and a linking mode invocable by a user operating said pointing device, said pointing device also being operable to move a cursor to any location on any of said windows displayed on said display device, said pointing device also having at least one control switch, a graphical aid method of visually linking objects on different application window pages comprising the steps of:

invoking said selection mode;

selecting a first object icon, said first object icon being on a first application window page;

navigating within said application window to a second object icon, said second object icon being on a second application window page different from said first application window page, said invoking, selecting and navigating being done by said user through operation of said pointing device;

highlighting said selected first object icon, such that said selected first object icon is visible simultaneously with said second object icon in said application window;

invoking said linking mode;

dragging a linking line between said first and second object icons, thereby completing a logical link between said first and second objects, said invoking and dragging being done by said user through operation of said pointing device.

14. The method retired in claim 13 wherein selection of said first object icon further comprises the steps of using said pointing device to move said cursor to said first object icon and momentarily turning on said at least one control switch, and wherein said highlighting consists of displaying a shadow image of said first object icon, said shadow image containing a label corresponding to said first page.

15. The method recited in claim 13 wherein selection of said first object icon further comprises the steps of using said pointing device to move said cursor to said first object icon and holding on said at least one control switch while moving said cursor to a location in the margin of said application window before releasing said control switch, and wherein said highlighting consists of displaying a page connector icon at said margin location, said page connector icon containing a label corresponding to said first application page.

16. The method recited in claim 13 further comprising the step of navigating back to said first application page, wherein said highlighting is removed from said first object icon and applied to said second object icon.

17. The method recited in claim 16 wherein said highlighting consists of displaying a shadow image of said second object icon, said shadow image containing a label corresponding to said second application page.

18. The method recited in claim 16 wherein said highlighting consists of displaying a page connector icon at said margin location, said page connector icon containing a label corresponding to said second application page.

19. The method recited in claim 18 wherein the step of navigating further comprises the steps of using said pointing device to move said cursor to said page connector icon and momentarily turning on said at least one control switch, thereby prompting display in said application window of the application page corresponding to the label contained in said page connector icon.

20. The method recited in claim 13 further comprising, after the step of dragging a linking line between said first and second object icons, the step of responding to a user command to hide said logical link by not displaying the linking line between said first and second object icons.

* * * * *

UNITED STATES PATENT AND TRADEMARK OFFICE
CERTIFICATE OF CORRECTION

PATENT NO. : 5,634,095
DATED : May 27, 1997
INVENTOR(S) : Wang et al

It is certified that error appears in the above-indentified patent and that said Letters Patent is hereby corrected as shown below:

claim 1, column 8, line 18 as follows:
change " made" to -- mode --;

claim 9, column 9, line 45 as follows:
change " reeked" to -- recited --;

claim 13, column 10, line 33 as follows:
insert -- and --;

claim 14, column 10, line 39 as follows:
change " retired" to -- recited --;

Signed and Sealed this

Sixteenth Day of September, 1997

Attest:

BRUCE LEHMAN

Attesting Officer

Commissioner of Patents and Trademarks